United States Patent [19]

Witzke

[11] 4,085,257
[45] Apr. 18, 1978

[54] RADIANT ENERGY CONVERTER HAVING STORAGE

[75] Inventor: Horst Witzke, Princeton, N.J.

[73] Assignee: Optel Corporation, South Brunswick Township, N.J.

[21] Appl. No.: 582,344

[22] Filed: May 30, 1975

[51] Int. Cl.² .................. H01M 6/30; H01M 6/36
[52] U.S. Cl. .................................................. 429/111
[58] Field of Search ........ 250/213 R, 213 VT, 211 R, 250/211 J, 212; 313/94, 483, 498; 136/89; 429/111

[56] References Cited

U.S. PATENT DOCUMENTS

| 2,975,291 | 3/1961 | Loebner et al. | 250/213 R |
| 3,001,078 | 9/1961 | Rulon | 250/213 R |
| 3,271,198 | 9/1966 | Winogradoff et al. | 136/89 |
| 3,628,017 | 12/1971 | Lerner | 136/89 X |
| 3,699,374 | 10/1972 | Scholl et al. | 313/94 |
| 3,892,472 | 7/1975 | Giglia | 350/160 R |
| 3,908,148 | 9/1975 | Lehrer et al. | 313/483 |
| 3,925,212 | 12/1975 | Tchernev | 250/527 |

OTHER PUBLICATIONS

F. Möllers et al., "On the Origin of the Photocatalytic Deposition of Noble Metals on TiO$_2$", *J. Electrochem. Soc.*, vol. 121, pp. 1160–1167, (1974).

*Primary Examiner*—Aaron Weisstuch
*Attorney, Agent, or Firm*—Morris Liss; Israel Gopstein

[57] ABSTRACT

A device capable of converting radiant energy to electrical energy and storing said electrical energy for future use is described. The device comprises a pair of electrodes, at least one of which is transparent, a compensator layer in contact with one of said electrodes, and a layer of a charge storage material in contact with the other of said electrodes and said compensator layer.

1 Claim, 3 Drawing Figures

RADIANT ENERGY CONVERTER HAVING STORAGE

BACKGROUND OF THE INVENTION

Several phenomena exist which involve the conversion of solar energy into electrical energy. The common solar cell, such as the silicon solar cell or solar cells made from various semiconductor materials, are generally based upon the photovoltaic effect wherein the direct conversion of solar radiation into electrical energy occurs across a PN junction. Alternatively, electron-hole pairs can be created at an interface by the Schottky effect. In the photogalvanic effect, solar radiation impinges upon a photoionizable material which undergoes redox reactions at the respective electrodes in contact with the photoionizable media. Generally, the devices using the aforementioned effects do not have the capability of storing the charge generated during the period of irradiation. Charge storage of these devices has been accomplished by coupling an external capacitor or storage battery to the device.

We have discovered that it is possible to construct a thin photosensitive cell having an integral charge storage media therein. This charge storage media is believed to function by storing a charge in potential traps or wells.

SUMMARY OF THE INVENTION

A device capable of converting radiant energy into electrical energy and storing the same comprises a pair of electrodes, at least one of which is transparent, a compensator layer in contact with one of said electrodes, and a layer of a charge storage material positioned between the other of said electrodes and said compensator layer, and means attached to said electrodes for connecting said device to a load to be driven by the voltage developed in said device. The layers are such that upon irradiation by activating photons, electrons are created which are stored in the charge storage layer.

The invention also comprises the steps of: (1) exposing the above-described device to activating radiation which creates electronic charge therein; (2) storing said charge; and (3) discharging at least a portion of said stored charge through a load.

DETAILED DESCRIPTION OF THE INVENTION

Electrodes

At least one electrode of the device must be transparent to the activating radiant energy. The second electrode is preferably comprised of an electrode material which is different from that of the first electrode. This second electrode need not be transparent. It is generally preferred that the electrode which will be contiguous with the charge storage layer and which will become the cathode upon irradiation of the device with activating photons be the transparent electrode. This electrode may be comprised of a transparent metal oxide film such as a transparent tin oxide film. The opposite electrode can be made of a number of materials but should be one such that in the completed cell, it will be the anode.

Charge Storage Layer

This layer comprises a film of a material which is capable of trapping charge and storing the charge for extended periods of time such that the voltage developed in the device is persistent. Generally, periods of time involved in the novel device range from hours to days or longer. In principle, any material having an appreciable density of charge trapping sites is suitable. However, practical requirements of the device are such that in useful materials, the charge storage must be readily dischargeable when attached across a load and the impedance of the charge storage layer should not be unduly high so as to allow for sufficient power. Examples of suitable charge storage layers are tungsten oxide and molybdenum oxide. Other oxides which exist in substoichiometric form, e.g., vanadium oxide, niobium oxide and tantalum oxide are suitable. It should be noted, however, that these materials must be chemically compatible with the compensator layer.

Compensator Layer

The compensator layer functions as an ionic source of compensating ions so as to prevent excessive space charge formation at the charge storage layer. Examples of suitable compensator layers are either strong or weak acids either alone or together with a supporting material. For example, sulfuric acid, a sulfuric acid/glycerine combination, a sulfuric acid/titanium oxide combination, or sulfuric acid/glycerine-titanium oxide combination.

The layers must be such that upon irradiation by activating photons, electrons are created which are stored in the charge storage layer. These electrons may be created either at interfaces between layers by a photovoltaic or Schottky effect or within a layer by a photogalvanic effect. While the exact nature of the process or processes involved in the creation of the electrons is not certain and, in fact, may differ depending upon the particular materials used for the various layers, the invention herein is independent of the process.

Figure 1:
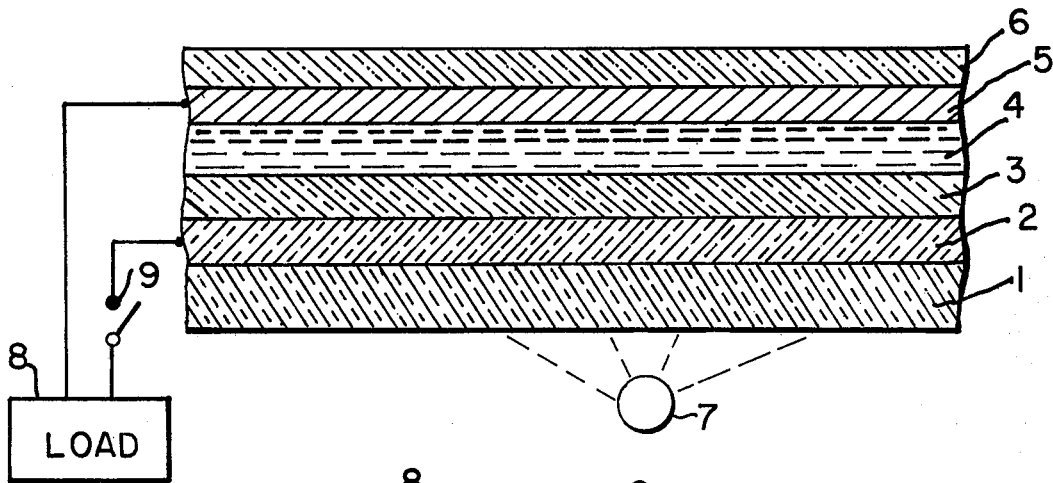
FIG. 1 is an elevational cross-sectional view of an embodiment of the invention.

Referring to FIG. 1, there is shown an elevational view of an embodiment of the invention. The cell may be described schematically as follows: $SnO_2$/WO/-Glycerine-$H_2SO_4$-$TiO_2$ pigment/carbon. In this example, a glass support plate 1 is coated with a transparent tin oxide coating 2 which serves as the cathode. A transparent tungsten oxide film 3 is deposited upon the tin oxide cathode 2. This tungsten oxide film serves as a charge storage layer. The tungsten oxide film 3 is in contact with a charge compensator layer 4 comprising a glycerine/sulfuric acid/titanium dioxide pigment mixture. The compensator layer 4 is also placed in contact with a second electrode 5 which acts as the anode. The anode in this example is comprised of carbon supported on a glass support plate 6.

In operation, the device is irradiated with light of a wavelength of about 4,000 Angstroms or less by passing the light through the transparent tin oxide electrode. During irradiation, the electrons will be created. These electrons are stored in the tungsten oxide film and will be discharged when a load is placed across the electrodes of the device.

While the process involved is not fully understood, it is believed that in the above configuration, the mechanism involved may be the photolytic decomposition of water in the charge compensating layer resulting in atomic hydrogen which enters the tungsten oxide film giving up its electron. The electron is then trapped by the tungsten oxide film. The hydrogen ion formed during this process remains in the tungsten oxide layer serving as a charge compensating ion. During discharge, electrons are withdrawn from the tungsten oxide film and hydrogen ions enter the electrolyte.

This figure, in addition to showing the bare device, indicates a source of irradiation 7, such as the sun, and a circuit wherein the device is utilized for driving a load 8. The circuit consists simply of a series connection between the device and the load together with switching means 9 used to complete or break the circuit.

Devices as described above thus far have achieved charge storage of approximately 20 to 50 millicoulombs per square centimeter of surface area of charge storage layer when this layer is about 0.5 microns thick. The particular storage capacity of the device is dependent upon the density of available charge trapping sites in the charge storage layer and the thickness of the layer. The voltage created by such a device as measured across the electrodes of the device ranges from about 0.2 to 0.5 Volts.

The example given can be activated by radiation of a wavelength of 4000 A. It is evident to those skilled in the art that suitable sensitization techniques may be employed to make the device responsive to larger wavelengths if so desired. A typical technique for example is the incorporation of a dye into or at the photoactive site; the dye having the properties of absorbing radiation of the desired wavelength and the property of being able to undergo a photo-induced oxidation-reduction reaction.

Figure 2:
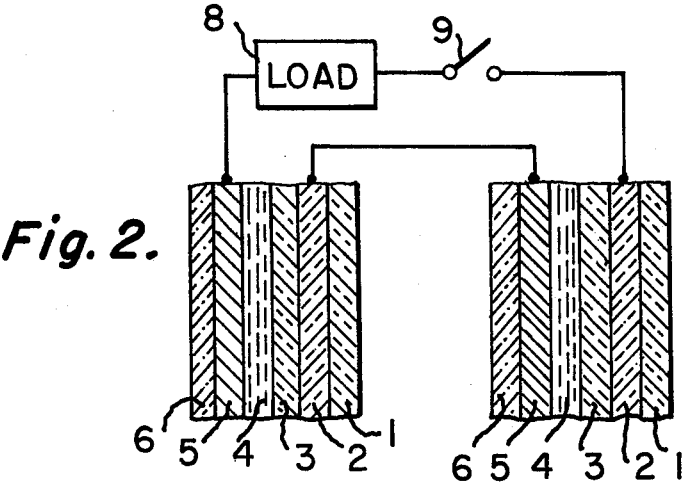
FIG. 2 is a block diagram showing a plurality of the devices described with reference to FIG. 1 connected in series.
Figure 3:
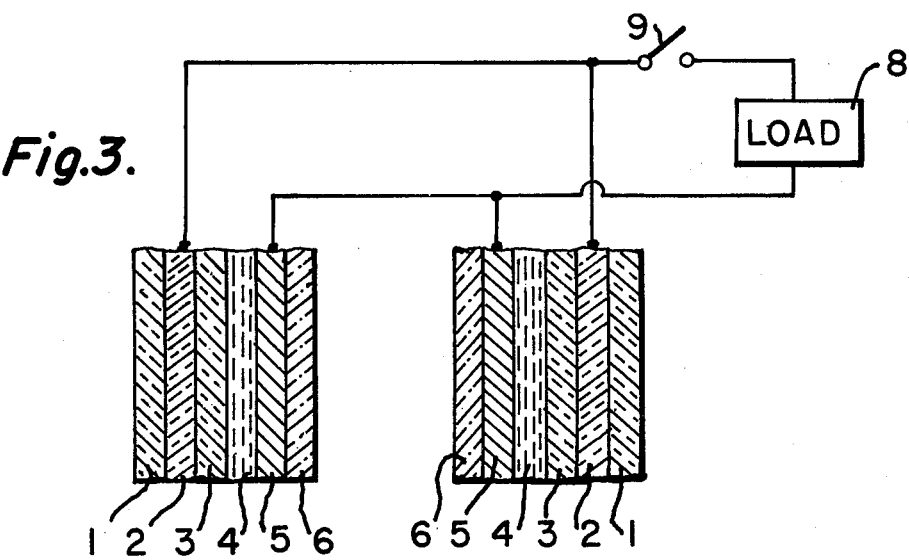
FIG. 3 is a block diagram showing a plurality of the devices described in FIG. 1 connected in parallel.

In order to increase the available voltage, a plurality of the energy conversion devices, either on a common substrate or from different substrates can be serially connected as shown in FIG. 2. Alternatively, if one wants to increase current output available from the device, a plurality of the devices may be connected in parallel as shown schematically in FIG. 3.

What I claim is:

1. A method of operating an energy conversion and storage device which comprises at least a pair of electrodes, at least one of which is transparent, a compensator layer in contact with one of said electrodes, a transparent layer of charge storage material comprising a refractory metal oxide positioned between the other of said electrodes and said compensator layer, said other electrode being transparent, and means attached to said electrodes for connecting said device to a load to be driven by the voltage developed in said device, the device being characterized by creation of electrons upon irradiation by radiant energy, said created electrons being stored in the charge storage layer, said method comprising the steps of:
    1. exposing the device to activating radiation to create electrical charge within said device;
    2. storing said charge within said device, and
    3. discharging at least a portion of said stored charge through a load.

* * * * *